United States Patent [19]

D'Alessio

[11] 4,099,823
[45] Jul. 11, 1978

[54] HIGH DENSITY MULTIPAIR CABLE CONNECTING BLOCK

[75] Inventor: Alfonso Joseph D'Alessio, Rockaway, N.J.

[73] Assignee: Bell Telephone Laboratories, Incorporated, Murray Hill, N.J.

[21] Appl. No.: 779,258

[22] Filed: Mar. 18, 1977

[51] Int. Cl.$^2$ .............................................. H01R 3/00
[52] U.S. Cl. ............................... 339/113 B; 339/97 P
[58] Field of Search ............. 339/113 B, 113 R, 99 R, 339/97 P

[56] References Cited

U.S. PATENT DOCUMENTS

| | | | |
|---|---|---|---|
| 3,496,522 | 2/1970 | Ellis, Jr. et al. | 339/99 R |
| 3,611,264 | 10/1971 | Ellis, Jr. | 339/99 R |

Primary Examiner—Roy Lake
Assistant Examiner—DeWalden W. Jones
Attorney, Agent, or Firm—Charles E. Graves

[57] ABSTRACT

Space conservation and ease of rearrangements are critically important in main frame management. This connector block improves on both by use of a basically rectilinear, flat connecting block module. The back side receives wire pairs from office equipment and incoming pairs from the outside plant. From there, the wires are led respectively to the top and bottom sides which are entrances, to wire guide channels for the respective groups. The channels are a series of curved, concentric, closely spaced, separate wire paths cast on either side of the module and terminating along a substantially curved edge which constitutes the fourth side of the module. Along this edge is molded a wire-receiving index strip. In its slots, the wires from the terminal equipment are set. Wires from the outside plant group are each terminated on the top end of a slotted beam connector for the 88 type. The module is then plugged to the index strip to achieve connection with the terminal equipment wire. Several such modules mounted side by side make up an assembly. Termination density twice that of existing blocks, without terminal block congestion, is achieved.

15 Claims, 13 Drawing Figures

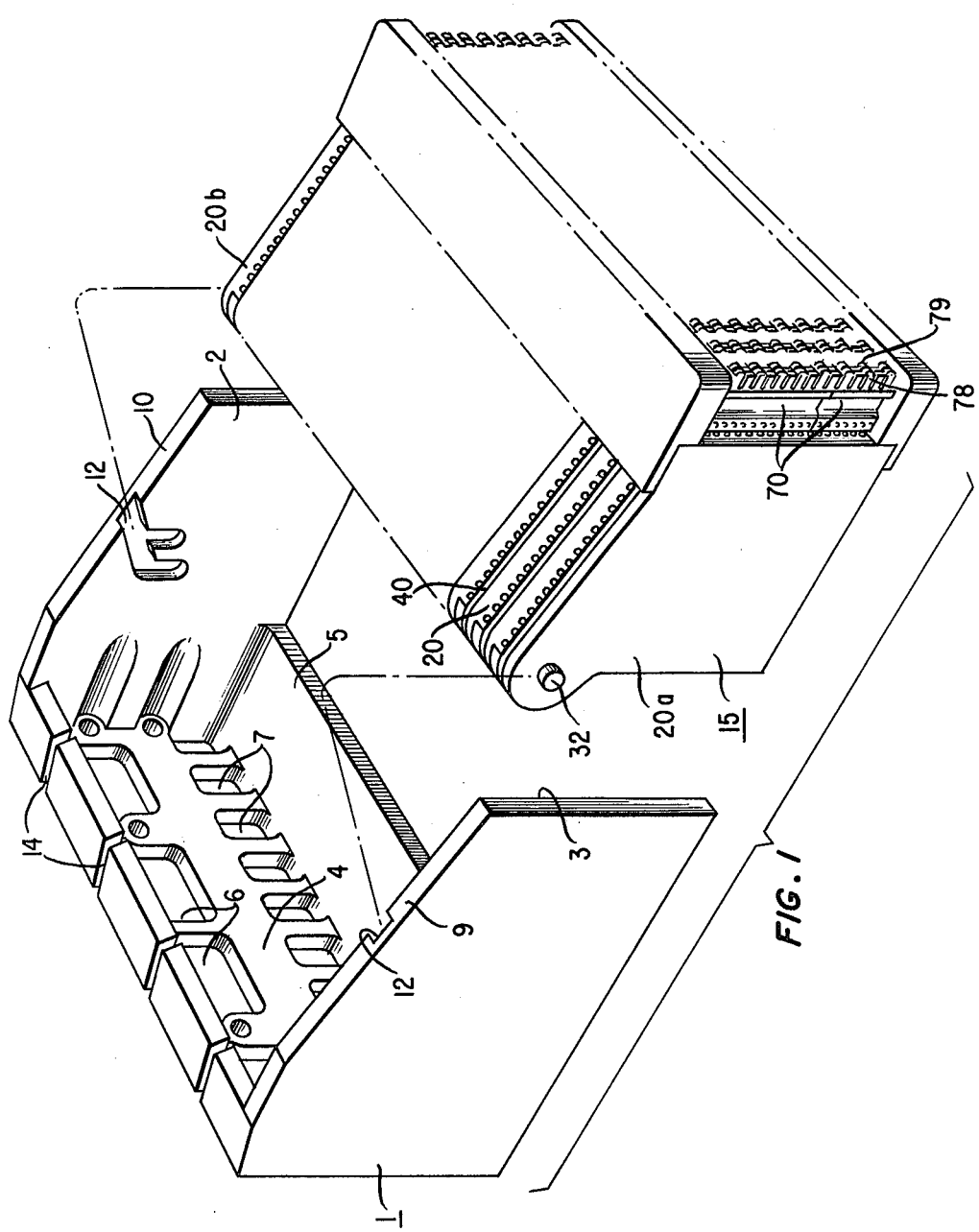
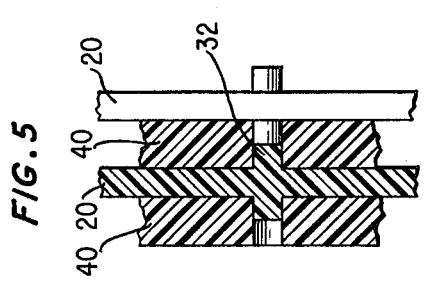
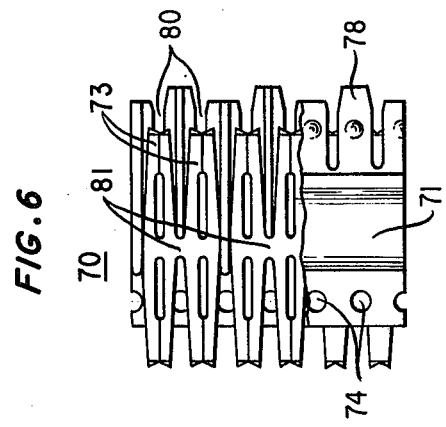

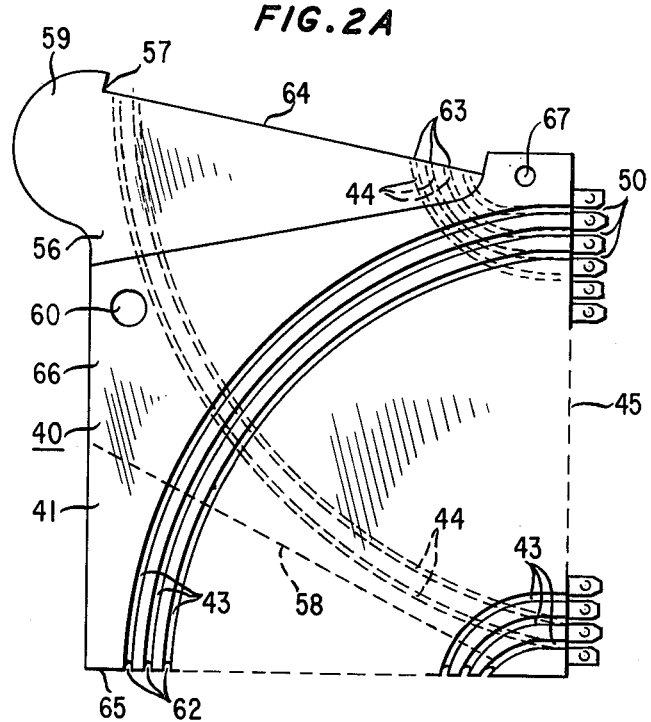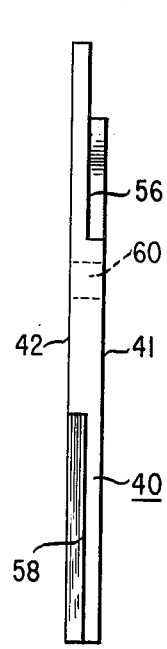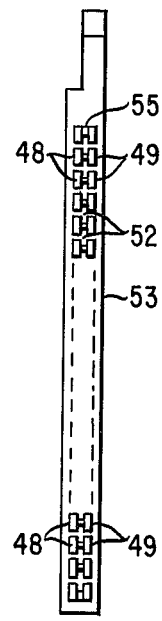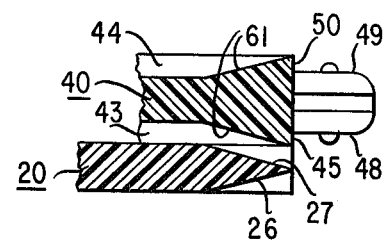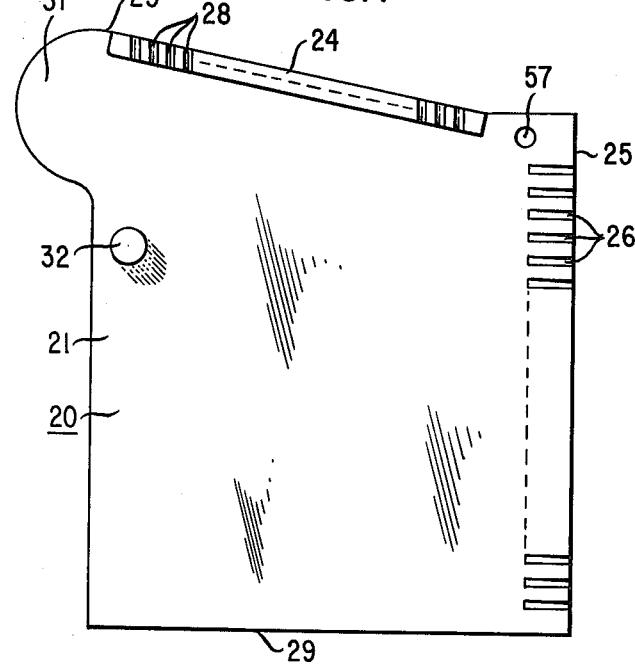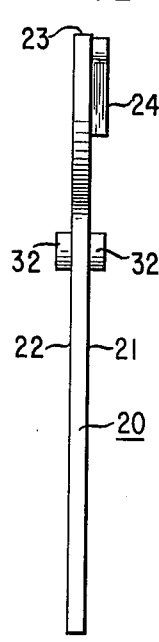

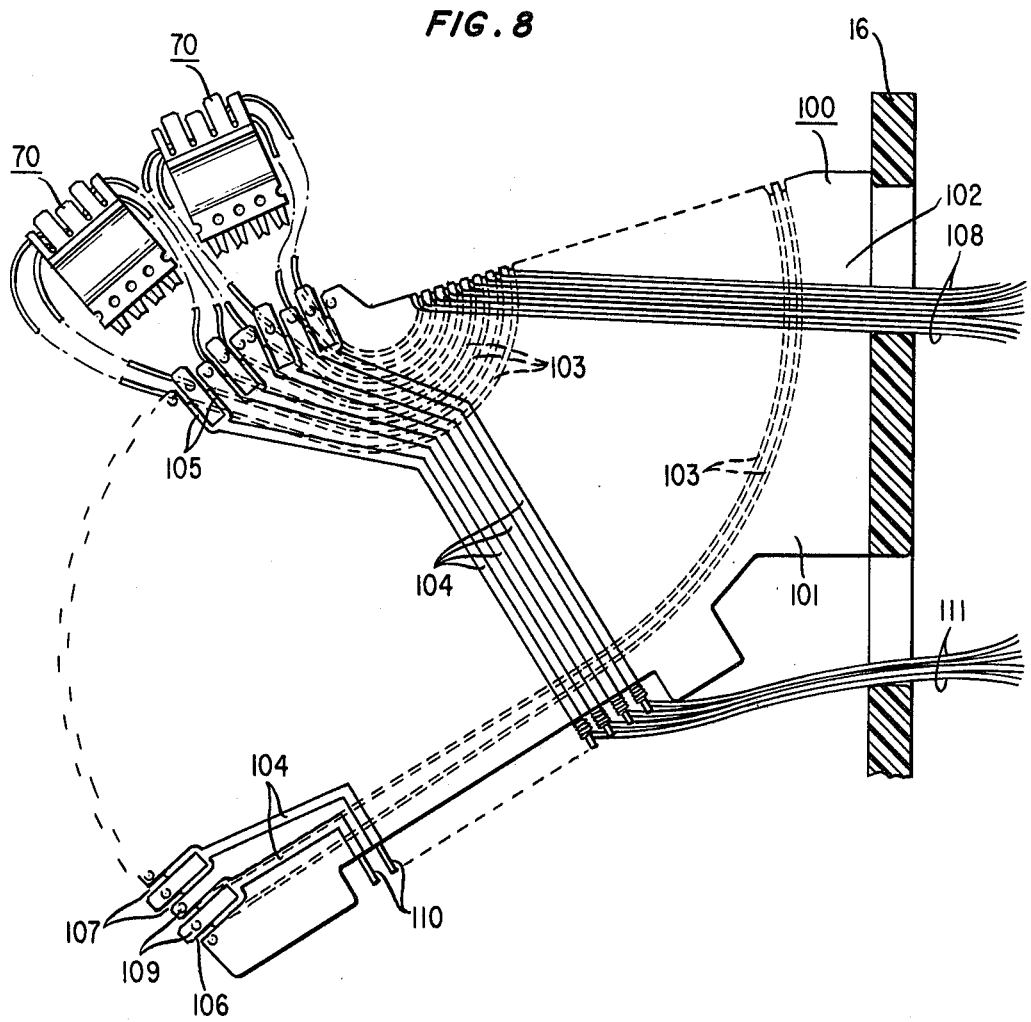

HIGH DENSITY MULTIPAIR CABLE CONNECTING BLOCK

FIELD OF THE INVENTION

This invention relates to electrical connection technology; and more specifically to high density multi-wire connections such as are found in central office main frames and computer backplanes.

BACKGROUND OF THE INVENTION

The main frame of a telephone central office contains electrical junctions between pairs leading to customer loops on the outside plant and to switching or other equipment within the central office. Many central offices also have termination frames to which certain equipments such as Metallic Facility Terminals are connected by wire pairs.

All central office wire frames are constantly being physically rearranged to accommodate new and changing loop and central office equipment requirements. Additionally, any surge in telephone loop for a given central office occasions a corresponding increase in wire frame connections and rearrangements. As a result of these factors, many central offices have become pressed for space to expand; and existing space utilization has come under increased scrutiny.

It has come to be recognized that state-of-the-art main frame connecting blocks, first of all, do not afford a high enough electrical connection density. Further, these blocks do not afford a sufficient degree of protection of the wires from physical damage during the constant rearrangement process described. Then, too, existing blocks do not adequately organize the individual wires, making main frame activity time-consuming and on occasion, uncertain.

An important element of organization — accessibility of the wires from both sides of the connection — also is lacking in existing connecting blocks. Also, many block designs are susceptible to "hits", or unintentional electrical bridging by an installer's tool as he works on given terminals.

The congestion, exposure, and difficulty of rearrangement, which generally characterize state-of-the-art wire frame connecting blocks, pose a multifaceted problem, a solution of which is afforded by the present invention.

SUMMARY OF THE INVENTION

The invention is embodied in an assembly of wire organizer elements consisting of alternate index plates and spacer plates, in the aggregate forming a connecting block. Pursuant to one aspect of the invention, each index plate is two-sided and each side has a series of closely spaced concentric wire-receiving grooves. One end of each set of grooves terminates at a selected edge of the indexing plate, along which are formed a number of spaced teeth defining wire fanning slots. These concentric grooves on respective sides of the index plate lead away from the index edge in opposite directions.

The two spacer plates next to each index plate serve to cover all grooves, this producing discrete, closed wire-receiving corridors. Because of their clockwise versus counterclockwise orientation, the respective groove sets culminate on opposite, or at least different, edges of the index plate. These edges are separated by the index edge itself; and are the point of feed for wires being loaded into the grooves.

Wires to be joined are inserted into the respective grooves from the feeder edges and on out the other end. The set of wires in grooves of the index plate's first side is then dressed into the fanning slots, along the index edge. The other set is connected to the lower end of double-ended slotted-beam connectors. Advantageously, the slotted beams are contained in gangs of four, eight, or more in a connector module. Connection is ultimately made by placing the module onto the index edge, the upper ends of the slotted beams contacting the wires in the fanning slot.

Pursuant to a further aspect of the invention, the wires in each set are respectively dressed over their feeder edge, and thence into a recess in the index plate. Each recess expands in width to a relatively wide mouth. Both mouths are located at a wire entrance edge of the index plate, which is distinct from the two feeder edges and the indexing edge. From these large mouths, the two wire sets are led through organizers on the main frame and then to respective connecting equipments.

Advantageously, an assembly of such indexing and spacer plates join to form a block; and the block is mounted for pivotal movement in a housing which itself is attached to the main frame. A selection of pivot positions for the block within the housing is provided by pivot pin guide grooves, to permit front access for all three principal wire-working surfaces, that is, the two surfaces containing the feeder edges, and the intermediate surface containing the indexing edge.

Advantageously, the back surface of the housing is formed with slots in rows and columns to provide further containment and organization for the wire groups leading to the entrance edge of the indexing plate.

The basic functions afforded by the indexing plate of the present invention can also be achieved by metallic circuit paths on one or both sides of the plate in place of the wire receiving grooves. In such cases, connections to wires are made, for example, by wire-wrap terminals.

The invention and its further objects, features and advantages, will be further delineated in the description to follow of the several embodiments taken in conjunction with the drawing.

BRIEF DESCRIPTION OF THE DRAWING

FIG. 1 is an exploded frontal perspective view of the housing and assembled block;

FIG. 2A is a side view of the index plate;

FIG. 2B is a back view of the index plate;

FIG. 2C is a front end view of the index plate;

FIG. 2D is a partial cross sectional view of the index plate and spacer plate;

FIG. 3A is a side view of the spacer plate;

FIG. 3B is a back view of the spacer plate;

FIG. 5 is a partial sectional detail showing the mating of the index plate and spacer;

FIG. 6 is a sectional side view of a connector showing internal connections between the slotted beam contacts;

FIG. 8 is a side view of an alternate embodiment of the index plate.

DETAILED DESCRIPTION OF ILLUSTRATIVE EMBODIMENTS

Figure 4A:
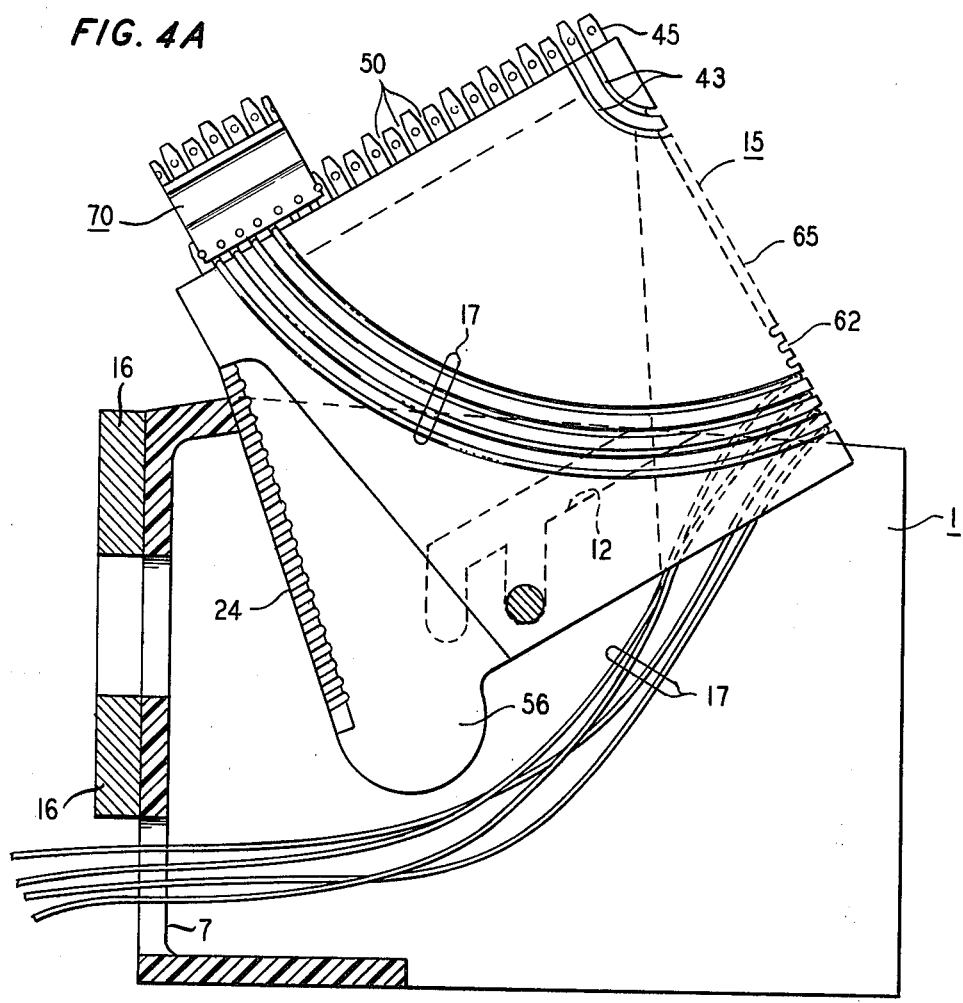
FIG. 4A is a sectional left side view of the housing and assembly block.

The sketch of FIG. 1 illustrates the invention embodied in a housing 1 and a block assembly 15, consisting of alternating spacer plates 20 and index plates 40. A pivot pin 32 extending from the left side end spacer plate 20A engages the loading groove 12 in housing 1 formed in the interior side of the left side wall 3.

The corresponding loading groove 12 formed in the top edge 10 in the interior surface of right side wall receives a similar pivot pin 32 (not shown) which extends from the right end of spacer plate 20B.

The rear wall 4 of housing 1 includes a number of top wire grouping windows 6 and lower wire grouping window 7. The floor 5 also aids in wire organization as well as lending rigidity to housing 1. Wire access slots 14 along the top rear edge of the housing 1 facilitate placement and removal of the wires grouped in the windows 6. The fastening holes 7 receive bolts or other fasteners (not shown), and constitute one way for fastening housing 1 to a main frame.

Block assembly 15 of the present embodiment includes a number of connector modules 70, which may advantageously be of the type described in B. C. Ellis, Jr. U.S. Pat. No. 3,611,264, issued Oct. 5, 1971 and assigned to applicant's assignee. The module 70, illustrated also in FIG. 6, effects connection between pairs of respective wire ends which are assembled and received in the places afforded for them within the assembly 15, the details of which will now be described.

INDEX PLATE

Each index plate 40 advantageously may be constructed with a basic rectangular body as illustrated in FIGS. 2A and 2B. The plate 40 consists of a left side 41 in which is formed a number of concentric wire-containing grooves 43. The grooves 43 begin at the indexing edge 45 of plate 40; and end at the lower feeder edge 65. A like number of concentric grooves 44 are formed on the right side 42 of plate 40 as seen in phantom view in FIG. 2A. The grooves 44 also begin at indexing edge 45, trace a pattern which in plan view criss-crosses the groove 43, and connect to the upper feeder edge 64 of plate 40. Advantageously, the grooves 43, 44 are paired so that the ends of respective said groove pairs along edge 45 are opposite one another.

Extending outwardly from the indexing edge 45 of plate 40 is a first row of teeth consisting of individual teeth 48; and next to each of these, a second row of teeth consisting of individual teeth 49. The teeth, 48, 49 correspond in numbers and spacing and are disposed along edge 45 in pairs. Connecting each of the corresponding teeth 48, 49 is a separator 55. Between each adjacent pair of corresponding teeth 48, 49 is formed a well 52. Each well 52 extends from the floor 53 of the index edge 45 and inwardly into the plate 40 a distance approximately equal to the height of the teeth 48, 49. Alternate ones of the teeth 48, 49 are slightly truncated, to make identification easier.

The space between each of the adjacent teeth pairs 48, 49 constitutes a fanning slot 50. Each slot 50 is in cross-alignment with corresponding ends of a given pair of concentric grooves 43, 44. Each of the teeth 48, 49 include an outer nub 54 which, as will be described, engages a snap hole in the connector module.

The construction of teeth 48, 49 along indexing edge 45 as just described, advantageously follows the construction taught in the cited Ellis U.S. Pat. No. 3,611,264 to which for further construction details the reader is referred.

Two wire storage and housekeeping recesses are provided on index plate 40. Recess 56 formed in the left side 41 as seen in FIG. 2A is positioned along the upper feeder edge 64. Recess 58 is formed on the right side 42, adjacent to the lower feeder edge 65. Both recesses 64, 65 widen in the direction of wire entry edge 66.

Advantageously, each of the connecting grooves 43, 44 begins at index edge 45 at essentially zero depth, and then gradually deepens in a ramp section until reaching its full depth. These lead-in ramps denoted 61 in FIG. 2D provide a wide bearing surface for each of the fanning slots 50. Also, the entrances 62 of the grooves 43, along the lower feeder 65, are undercut as shown in FIG. 2A to provide additional wire retention capability.

SPACER PLATE

Spacer plate 20 shown in FIG. 3A and FIG. 3B consists of a left side 21 and a right side 22. The indexing edge 25 of plate 20 includes a number of tapered wire guide slots 26 on left side 21, and tapered wire guide slot 27 on right side 22. As seen in FIG. 2D, the guide slots 26, 27 cooperate with the lead-in ramp 61, indexing edge of plate 40, to supply a constant height to the wire guide grooves.

The upper edge 23 of plate 20 includes a fanning strip 24 extending outwardly from the left side 21. Fanning strip 24 includes a number of wire receiving slots 29 which correspond in number and spacing to the entrances 63 of the grooves 44 where they intersect the upper feed edge 64 of plate 40. Fanning strip 24 fits snugly into the cutout 57 above the upper feeder edge 64 which is seen in FIG. 2A.

The lower edge 29 of spacer 20 is flat. Advantageously, both upper edge 23 and lower edge 29 may have designations or other wiring information embossed or otherwise placed on their surfaces to identify the origins or uses of the wires in the grooves 43, 44 of the adjacent index plate (designations not shown).

The rounded edge extension 31 of plate 20 corresponds to the rounded edge extension 59 of plate 40. These extensions 31, 59 serve to further assure separation of wires. Spacer plate 20 advantageously includes a pivot pin 32 which extends from either side 21, 22 and which advantageously may be molded in the same process in which the plate 20 is formed. Alternatively, the pin may be metal. The pin 32 cooperates with the guide hole 57 of index plate 20 to locate and fasten together the two plates 20, 40 in the manner, for example, shown in FIG. 5. Additionally, the line-up holes 67 and 57 of the index plate 40 and spacer plate 20 respectively, receive an elongated pin, (not shown) which when installed properly locates all plates 20, 40 transversely and laterally with respect to each other. An identification bumper 90 supplies a surface on which to place data concerning the connections made on the block.

CONNECTOR MODULE

As seen in FIGS. 1 and 6, each connector module 70 consists of a body 71 which houses a number of double-ended insulation-piercing slotted-beam connectors. These may be electrically and mechanically separate elements; or as in FIG. 6, certain adjacent ones of the elements 73 may be joined as with a metallic bridge 81. The body 71 includes advantageously a configuration of teeth that corresponds to those on the index edge 45 of index plate 40. The connector module teeth 78, 79 are provided in pairs between which are fanning slots 80. The upper ends of the slotted beam elements 73 are stationed with their wire receiving slots centered on respective fanning slots 80. Snap holes 74 in FIG. 6 accommodate to the nubs 54 of the index plate 40. The connector modules 70 are conventional and advantageously may be those of the aforementioned Ellis patent.

FIG. 8 illustrates an alternate form of the information in which an index plate 100 consisting of right hand side 101 and a left hand side 102, is provided with concentric grooves 103 on the right hand side. Grooves 103 correspond in function with the concentric grooves 43, 44 of index plate 40. Index plate 100 however, on the left hand side 102 is provided with metallic circuit paths 104 which serve the same function electrically as wires. Additionally, index edge 106 is curved approximately in an arc of about 90°. The index edge 106 is provided with indexing teeth 10a advantageously having the same structure of the teeth of index strip 40. The grooves 103 terminate next to the fanning slots 107 between teeth 109.

The ends of metallic paths 104 can be bifurcated to form contact lands 105, for special bridging purposes. Alternatively, the lands can be configured to provide individual service to respective fanning slots 107. Each contact land 105 is formed over in the shape of a wire into the respective fanning slot 107.

Wires from the wire group 108 are fed into the concentric grooves 103 and terminated at the upper end of connector modules 70. The modules then are plugged in so that the lower end of the bifurcated beam element makes electrical contact with the exposed wire end of the land 105.

At the far end of the circuit paths 104, wire wrap terminals 110 are provided, to which a second group of wires 111 are connected. The index plate 100 is paired with spacer plates (not shown) in a manner such as illustrated in FIG. 1; or in appropriate cases can be used alone. Although index plate 100 is not shown as pivotally mounted in FIG. 8, a pivotal mount can be supplied as can a housing of the type denoted 1 in FIG. 1.

OPERATION

Figure 4B:
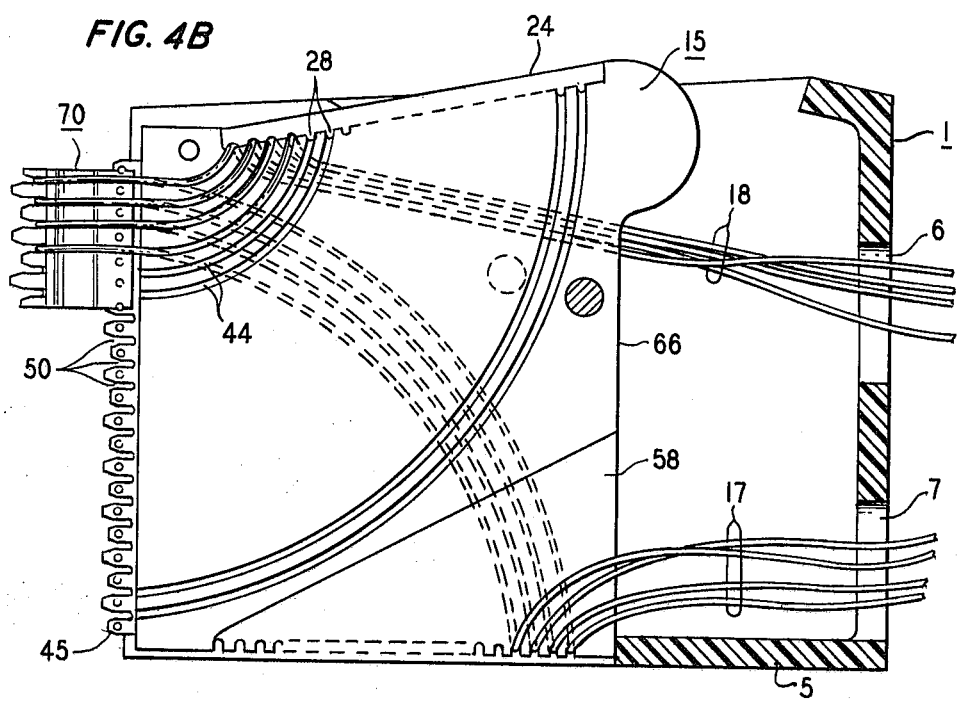
FIG. 4B is a sectional right side view of the housing and assembled block.
Figure 7:
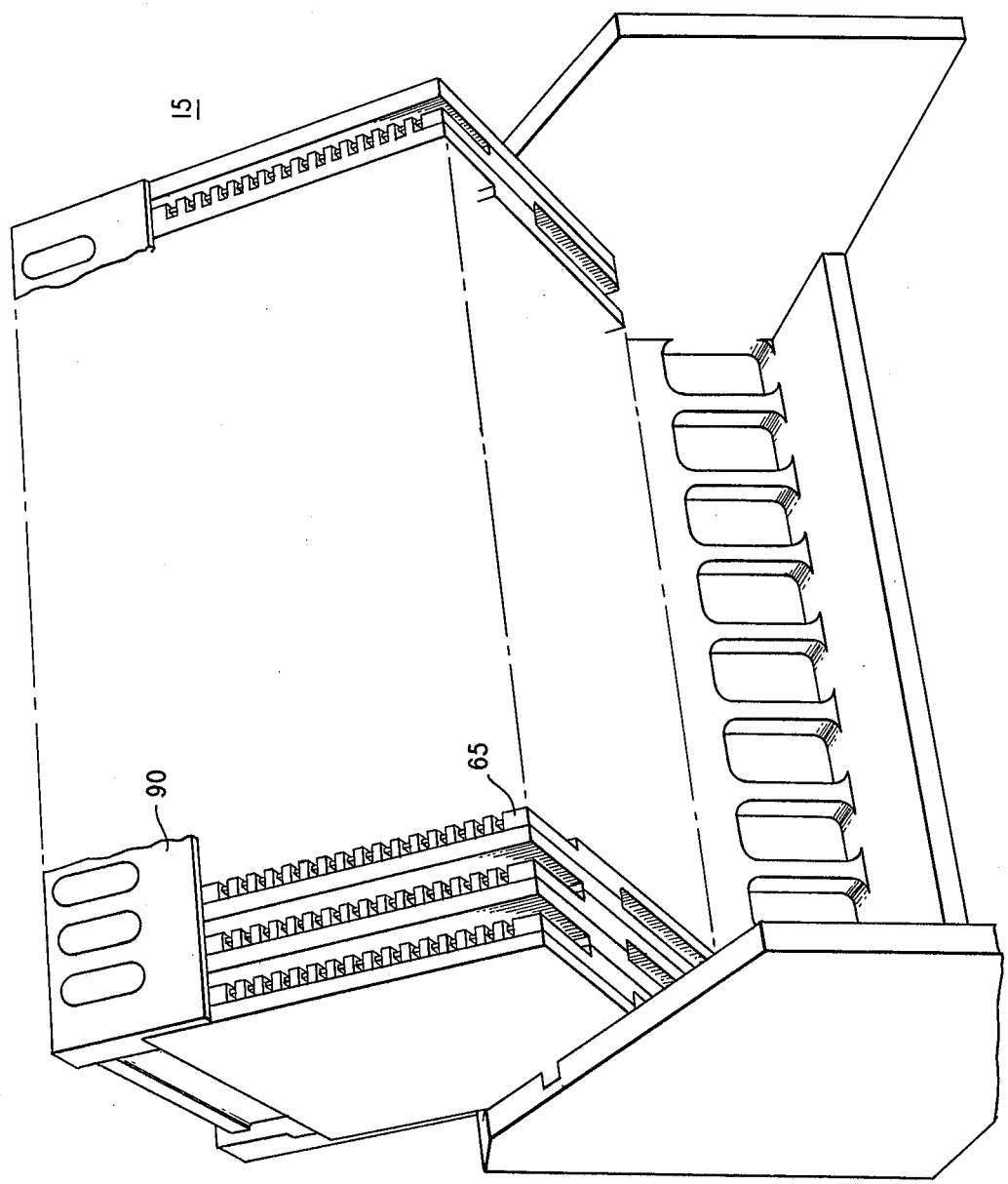
FIG. 7 is a frontal perspective view of the housing and block assembly in a raised position.

FIGS. 4A and 4B help illustrate the placement in service and subsequent use of the housing and block assembly of the present invention.

Advantageously, the housing 1 is mounted on a conventional main distributing frame shown symbolically as element 16. The block assembly 15 may be mounted at any time thereafter, by guiding the extending pivot pins 32 as shown in FIG. 1, into the loading grooves 12 of the housing. The in-service position is illustrated in FIG. 4B. Block assembly 15 is securely held in housing 1 by force of gravity and by the abutting action of the forward edge of the floor 5 of the housing.

At the time of initial equipment wire installation, wires 17 from switchboard cabling are lead through the main frame, and separated into sub-groups which are then fed through lower window 7 and dressed out. With the correct address of each wire first ascertained, the several wires are then successively inserted into respective wire passages formed by grooves 43 and the adjacent side of the spacer plate 20.

Under a general pushing action each wire end slips effortlessly into its channel and reappears along side the indexing edge 45 adjacent to its fanning slot 50. When the wires 17 are placed in position, the wires for each slice are dressed into the storage recess 58 and also seated in the entrances 62 of the lower feeder edge 65. The cable groups are then secured to the main frame leaving ample room for block rotation as shown in FIG. 4A. The block is then rotated down to the normal position shown in FIG. 4B.

Connector module 70 can now be installed on the index edge 45. Pair groups such as 18 from, for example, a loop cable (not shown), and fed through window 6 of housing 1 individually, and manually placed into the proper wire receiving slots 28, associated with fanning strip 24. Each wire readily travels through the grooves 44 and emerges at index edge 45 adjacent to the desired corresponding terminal for the connector module 70. Each wire of group 18 is dressed over the upper end of the slotted beam element 73. The wire group 18 is dressed into the storage region 56; and the installation is complete.

The described use of index and spacer plates provides a simple means for changing main frame connector block connection density, without changing the block profile and without incurring new development costs. The same plates can be used in many different applications, by merely changing the identification code. Other identification expedients, such as color coding and relief style grouping may of course be employed.

The separating of cross-connect field and equipment wires greatly reduces congestion, and affords an unobstructed view of the terminal fields and wire access points. Through containment of wires within the block, and the use of the described connector module, rearrangements are supplied and the chaos of hits reduced.

The spirit of the invention is embraced in the scope of the claims to follow.

What is claimed is:
1. A wire organizer comprising:
   a two-sided index plate having multiple edges including an indexing edge and two feeder edges;
   a set of spaced concentric grooves in each of said sides, each groove set terminating at said indexing edge, leading therefrom in opposite directions and culminating on respective said feeder edges which are separated by said indexing edge;
   a recess adjacent to each said feeder edge disposed on the side of said index plate opposite that which contains the groove set connecting with each said feeder edge; and
   means for covering all grooves.
2. The wire organizer of claim 1 wherein said covering means comprises a two-sided spacer plate having multiple edges including an indexing edge, said spacer plate contacting one side of said index plate with said indexing edges mutually adjacent.
3. The wire organizer of claim 2 wherein each of said index plate grooves at said indexing edge comprises a lead-in ramp that deepens with increasing distance from said indexing edge; and wherein said spacer plate at said index edge comprises plural slots corresponding in number and position to said lead-in ramps, said slots deepening with decreasing distance from said indexing edge.
4. A wire organizer, comprising:
   a plurality of two-sided index plates each having multiple edges including an index edge and two distinct feeder edges separated by said index edge;
   a set of spaced, concentric grooves in each of said sides;

each groove set terminating at said indexing edge, leading therefrom in opposite directions, and culminating on a one of said distinct feeder edges; and a wire-receiving recess adjacent to each said feeder edge disposed on the side of said index plate opposite that which contains the groove set culminating with each said feeder edge;

a plurality of two-sided spacer plates having multiple edges including:

an indexing edge;

the adjacent spacer and index plates being in mutual contact, to cover said grooves; and alternating in sequence, to form an assembly.

5. The wire organizer of claim 4 wherein said indexing edge of said index plate comprises:

a series of spaced extending teeth defining wire fanning slots therein between; and wherein said groove ends on respective sides of said indexing edge are arrayed in pairs along opposite sides of respective ones of said fanning slots.

6. The wire organizer of claim 5, further comprising first and second sets of wires disposed in the respective said groove sets, the wire ends of said first wire sets being dressed into said fanning slots; and means connecting the wires of said first set to respective said wires of said second set.

7. The wire organizer of claim 6 wherein said connecting means between the wires of said first and second wire sets comprises double-ended slotted-beam connectors.

8. The wire organizer of claim 7, wherein a single wire is disposed in each of the respective said grooves of each said index plate.

9. The wire organizer of claim 8 wherein said connector means further comprises means for mounting several of said slotted beam connectors in discrete modules.

10. The wire organizer of claim 9 further comprising means for securing each said module onto respective ones of said teeth of said indexing edge.

11. The wire organizer of claim 10, further comprising:

a set of alignment holes through said index plates and a pair of extending pins on each said spacer plate, with the respective said alignment holes receiving the pins of the adjacent said spacer plate; and with the outermost elements of said assembly being spacer plates.

12. The wire organizer of claim 11 further comprising:

a housing for receiving said assembly, said housing comprising:

a rear wall and an open front connected by two side walls, each said side wall comprising on its respective interior surface, channels for pivotally receiving the respective extending pins of the two said outer elements.

13. The organizer of claim 12, wherein said channels further comprise means for receiving said assembly in a range of pivot positions that successively expose the first set of distinct said feeder edges, the indexing edges of said plates, and the second set of distinct said feeder edge to the open front of said housing.

14. The organizer of claim 12, wherein said housing rear wall further comprises plural windows for separately grouping wires connected to predetermined sections of said assembly.

15. The organizer of claim 14, further comprising first means for identifying individual ones of said index plates, and second means for identifying individual wire positions along the respective said feeder edges of each said index plate.

* * * * *